March 5, 1968 R. W. AHRONS ET AL 3,372,384

CRYOELECTRIC MEMORY

Filed March 16, 1964 3 Sheets-Sheet 1

INVENTORS
RICHARD W. AHRONS &
DAVID A. CHRISTIANSEN
BY Samuel Cohen
Attorney

March 5, 1968 R. W. AHRONS ET AL 3,372,384

CRYOELECTRIC MEMORY

Filed March 16, 1964 3 Sheets-Sheet 2

INVENTORS,
RICHARD W. AHRONS &
DAVID A. CHRISTIANSEN
BY Samuel Cohen
Attorney

INVENTORS
RICHARD W. AHRONS & DAVID A. CHRISTIANSEN
BY Samuel Cohen
Attorney 3,372,384

CRYOELECTRIC MEMORY

Richard W. Ahrons, Somerville, and David A. Christiansen, Trenton, N.J., assignors to Radio Corporation of America, a corporation of Delaware Filed Mar. 16, 1964, Ser. No. 352,177
12 Claims. (Cl. 340—173.1)

This invention relates to improvements in cryoelectric memories.

A known continuous sheet cryoelectric memory includes a thin-film memory plane, X and Y drive leads which are insulated from one another and from the memory plane located over one surface of the memory plane, and output means including a continuous sheet "sense plane" located on the other side of the memory plane. A drive current is applied to a selected X drive lead and a selected Y drive lead to write information into a particular location in the memory plane. This information is stored as trapped flux beneath the cross-over point of the selected leads. The polarity of the stored trapped flux, that is, the direction of circulation of the persistent currents which are associated with the trapped flux, indicates the value of the bit stored (1 or 0).

Information is read out of the memory plane by applying interrogate or read current pulses to a selected X and a selected Y drive lead. At the cross-over point of the selected leads, the magnetic field due to the read current pulses is of sufficient magnitude to penetrate through the memory plane and reverse the trapped flux when the bit stored is of one value (corresponding to trapped flux of one polarity) but not when it is of the other value (when the trapped flux is of opposite polarity). When the trapped flux reverses, an output "sense" signal is produced at the output terminals of the sense plane.

The memory discussed above has been found to provide sense signals which are detectable and useful. However, the noise level is sometimes relatively high. (Noise is considered to be any signal other than the desired sense signal.)

The object of the present invention is to provide cryoelectric memories having improved signal-to-noise ratios.

High signal-to-noise ratio is achieved in the present invention by arranging the drive and other leads in such manner that image currents induced in the memory plane are caused to flow in paths such that these currents induce very little noise in the sense plane, and by reducing the effects of drive signal radiation from unshielded portions of the drive leads. (Image currents are currents which are induced in a superconductor in response to current in a lead adjacent to a surface of that superconductor. Image current should not be confused with stored current, that is, persistent circulating current.) Noise due to image currents is reduced by positioning both the drive leads and the common returns for the drive leads over the memory plane throughout substantially their entire extent and causing the common return leads to leave the memory plane at a location immediately adjacent to the point at which the corresponding drive leads enter the memory plane. So arranged, the image currents which are induced in the superconductor memory plane in response to the drive currents remain substantially entirely on the surface of the memory plane adjacent to the drive leads. Little or no image current flows on the other surface of the memory plane, that is, the surface adjacent to the sense plane, and this substantially reduces the amont of noise induced in the sense plane by the image current.

Another source of noise is believed to be due to penetration, through the superconductor memory plane, of the magnetic field associated with a drive current, even at locations other than a selected memory location. The amount of penetration is thought to depend upon the amount of drive current and the thickness of the superconductor memory plane. The thinner the memory plane, the greater the amount of magnetic field penetration and, correspondingly, the greater the amount of spurious noise believed to be induced in the sense plane. By arranging the drive and return leads to be parallel and both to be located directly over the sense plane, the spurious sense signals induced by the drive currents present in the input portions of the drive leads are in a polarity opposite to that of the spurious sense signals induced by the drive currents in the common return leads, and tend to cancel.

The effect of drive signal radiation from unshielded drive leads is reduced in the present arrangement, first by reducing the amount of unshielded leads to a minimum and, second by arranging the output leads of the sense circuit in balanced fashion so that spurious radiated signals received at the output leads tend to cancel.

The invention is discussed in greater detail below and is shown in the accompanying drawings, of which:

Figure 1:
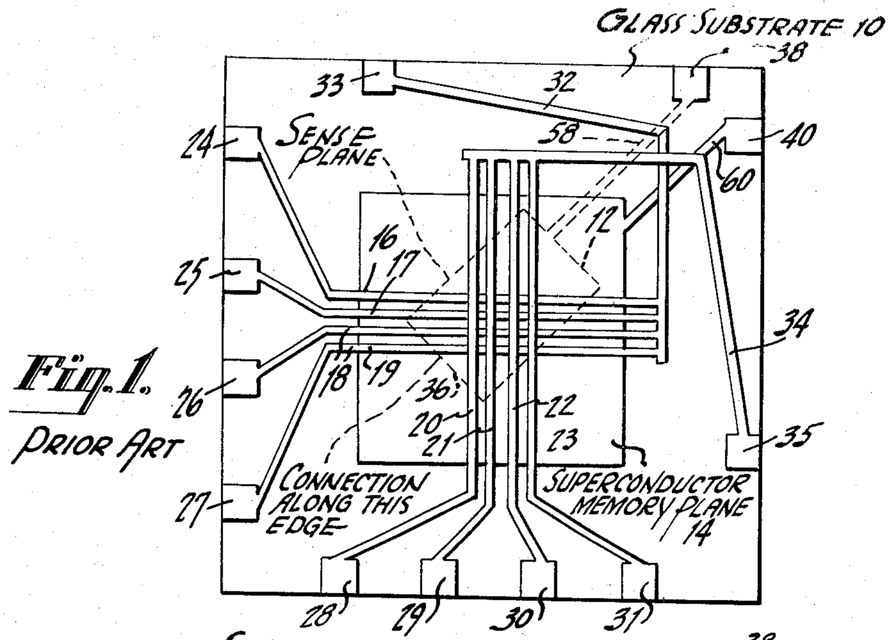
FIGURE 1 is a plan view of a prior art cryoelectric continuous plane memory.
Figures 4, 5:
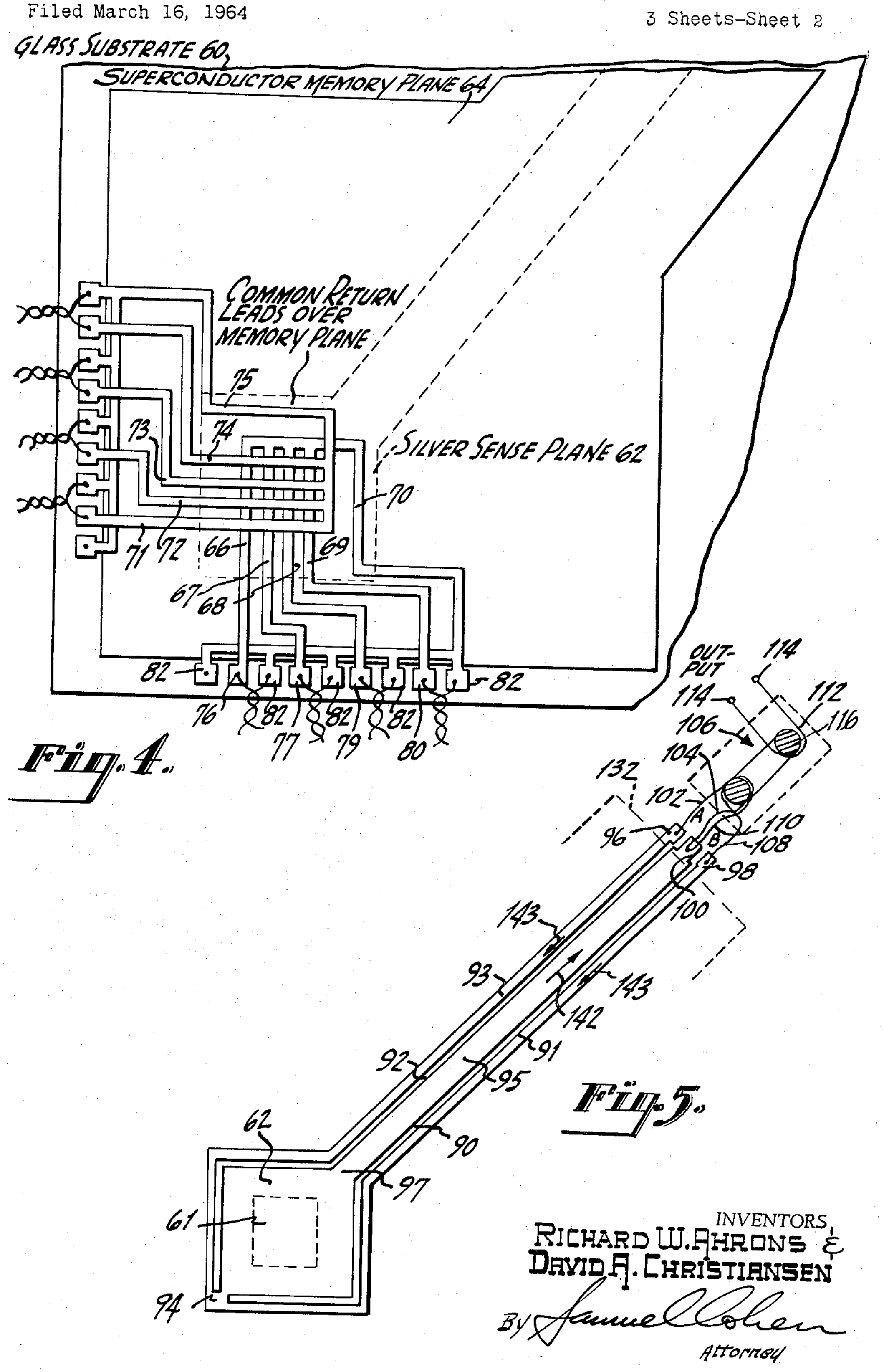
Figures 6, 7:
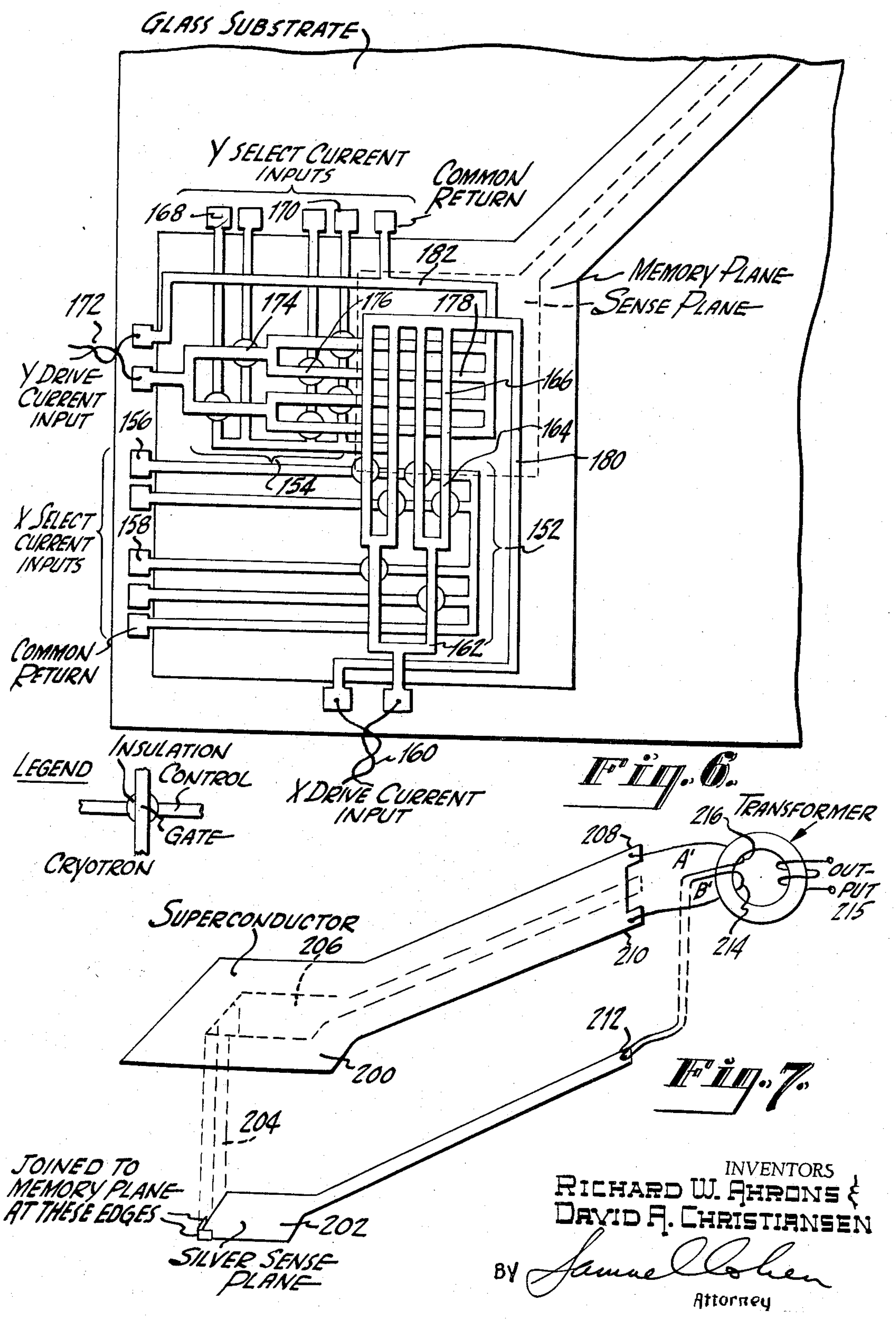

FIGURl 3 is an exploded schematic showing of one drive lead, the memory plane and the sense plane of FIGURE 1, the purpose of which is to help explain the paths taken by the image current;

FIGURE 4 is an enlarged plan view of a portion of a cryoelectric continuous sheet memory according to the present invention;

FIGURE 5 is a plan view of the sense plane of the memory of FIGURE 4;

FIGURE 6 is a plan view of a second form of memory according to the present invention, this one including cryotron current steering networks; and FIGURE 7 is an exploded view of a portion of another embodiment of a memory system according to the invention.

In the discussion which follows, a low temperature environment, such as a few degrees Kelvin, at which superconductivity is possible, is assumed.

The prior art memory discussed in the introductory portion of this application is shown in FIGURE 1. It includes a glass substrate 10 and a conductive sense plane 12 formed of a metal, such as silver, on the substrate. The sense plane, the memory plane, the drive leads and so on, are all in the form of thin films, and they are preferably formed by deposition in a vacuum.

A silicon monoxide layer of insulation is deposited over the sense plane 12 and a superconductor memory plane 14 is then deposited over the insulation. The memory plane is preferably formed of a superconductor, such as tin. Another layer of insulation is formed over the memory plane and the Y leads 16–19 are then deposited. Thereupon, another layer of insulation is laid down, and then the X leads 20–23. The X and Y leads are preferably formed of a superconductor, such as lead.

The Y leads connect to terminals known as lands 24–27, respectively, and the X leads connect to lands 28–31, respectively. The common Y return lead 32 connects to land 33, and the common X return lead connects to land 35.

The sense plane 12 is connected at one edge 36 to the memory plane. The sense plane is connected at its opposite edge to land 38, and the memory plane is connected to land 40.

Information may be stored at a desired location in the memory of FIGURE 1 by concurrently applying a write current pulse to a selected X lead, and a write current pulse to a selected Y lead. The magnetic field thereby produced at the cross-over of the selected X and Y leads is of sufficient magnitude to penetrate through the superconductor memory plane 14. This causes circulating currents to be established in the memory plane at the cross-over point of the leads, and these currents remain as persistent circulating currents after the drive current pulses terminate.

Information may be read from the memory of FIGURE 1 by applying read current pulses to a selected X and a selected Y lead. When the circulating currents at the cross-over of the selected X and Y leads are in a particular direction, the magnetic field produced by the read pulses will reverse the trapped flux in the memory plane and cause a voltage, termed a "sense signal," to be induced in the sense plane 12. This voltage, or some portion of this voltage, appears at output terminals 38 and 40. When the circulating currents stored at the cross-over are in the opposite direction, the magnetic field due to the read pulses does not reverse the flux trapped in the memory plane, and substantially no sense signal is produced.

In the arrangement of FIGURE 1, the common return leads 32 and 34 extend over the edge of the memory plane opposite the edge at which the drive leads cross the memory plane. Moreover, leads from the memory and sense planes to the lines 38 and 40 extend a substantial distance beyond the edge of the memory plane.

Figure 2:
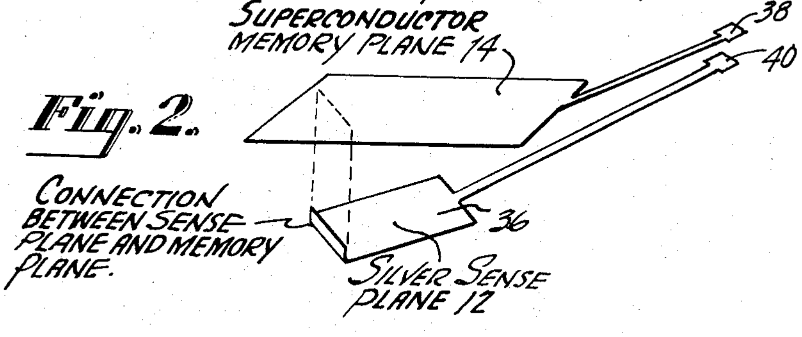
FIGURE 2 is an exploded view of the memory plane and sense plane of the memory of FIGURE 1.

In operating the memory shown in FIGURES 1 and 2, while a detectable and useful signal is obtained, there is more noise than desired. It is believed that there are a number of sources of this noise. The first is believed to be noise due to radiation from the unshielded portions of the drive leads to the unshielded portion of the sense circuit. The unshielded portion of the circuit is defined as that portion of the circuit which is not directly over or under a superconductive memory or superconductive ground plane.

Figure 3:
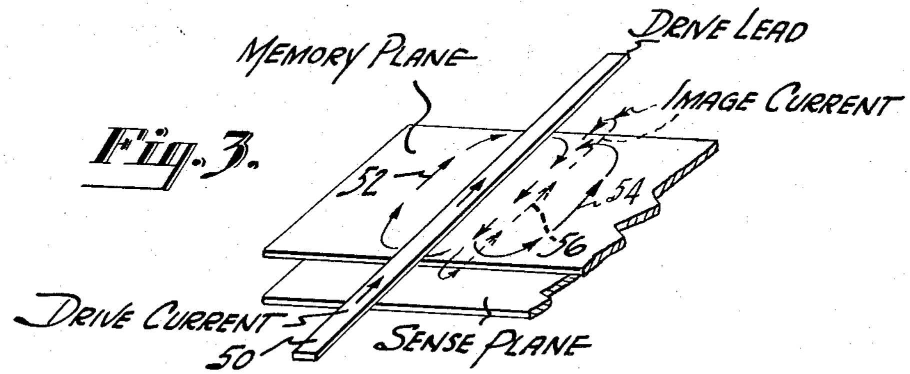

Another source of noise is illustrated in FIGURE 3. When a drive current is applied to any one of the drive leads, such as lead 50 which is illustrated, an image current which flows in a direction opposite to the drive current is induced in the upper surface of the memory plane immediately beneath the drive lead. This image current must have a return path. Part of this return path is believed to occur on the upper surface of the memory plane, as indicated by arrows 52 and 54. These are believed not to cause noise. However, part of the current in the return path is believed to flow beneath the memory plane, as indicated by the dashed arrows 56. These are believed to induce spurious signals (noise) in the sense plane.

A third source of noise, especially when the memory plane is made exceedingly thin, is believed to result from direct coupling from the drive leads through the memory plane to the sense circuit. When a superconductor, such as a memory plane, is exceedingly thin, it is believed not to be a perfect shield, even in the superconducting state.

A portion of one form of cryoelectric memory according to the present invention is shown in FIGURE 4. The various memory layers are similar to those already described. However, the sense plane configuration, which is discussed in connection with FIGURE 5, and the way in which the leads and lands are arranged are different. In addition, the sense plane is spaced throughout its entire extent from the memory plane, and not joined to the memory plane as in the arrangements of FIGURES 1 and 2.

FIGURE 4 shows a substrate 60, which may be glass, and the silver sense plane 62 (shown by dashed lines) on the glass substrate. The superconductor memory plane 64 is insulated from and lies over the sense plane. The X drive leads 66–69 and the common X return lead 70 are insulated from and lie over both the superconductor memory plane 64 and the sense plane 62. The Y drive leads 71–74 and the common Y return 75 are insulated both from the memory plane and the X drive leads and lie over the X drive leads. All conductors are in the form of thin films and are made by deposition in a vacuum. The memory plane is preferably formed of tin and the drive leads of lead. Insulation may be silicon monoxide.

The X drive leads are connected at the one end to lands 76–80, respectively, and the common return 70 is connected to a plurality of lands 82 which are interleaved with the lands for the drive leads. It should be observed that the drive leads and the return extend over the superconductor memory plane 64 for substantially their entire length. The lands for the Y drive leads and the common Y return are similar to the corresponding elements of the X drive lead circuits and therefore need not be discussed separately.

A more detailed showing of the sense plane, including the output terminals thereof, appears in FIGURE 5. The sense plane 62 is located on the glass substrate 60 (not shown in FIGURE 5). The sense plane lies immediately beneath the superconductor memory plane and has an area considerably smaller than that of the memory plane, and somewhat larger than the area over which the X and Y lead cross-overs occur (the latter area is roughly that within the dashed block 61). The sense plane is formed with two slots 90 and 92, lying adjacent to the peripheral edges of the plane. However, the sense plane is continuous in the corner area 94, that is, the slots do not join one another in this area. The purpose of the slots is to provide convenient return leads which are "joined" to the corner 94 of the sense plane. The other "lead" 95 (actually a thin film which is continuous with the sense plane) is joined to the sense plane at the opposite corner 97 thereof.

There are three output terminals for the sense plane, namely 96, 98, and common terminal 100. The output terminals 96 and 100 are connected via leads 102 and 104 to one primary winding of a transformer 106. The terminals 98 and 100 are connected via leads 108 and 110 to a second primary winding of transformer 106. The secondary winding 112 of the transformer 106 leads to output terminals 114. The transformer core, comprising a material such as permalloy, is shown at 116.

The memory shown in FIGURES 4 and 5 has been found to have greatly improved signal-to-noise ratio with respect to the prior art memory of FIGURE 1. There are a number of reasons. First, the common return leads 70 and 75 (FIGURE 4) occur over the memory plane for substantially their entire length. In addition, the lands for the common return leads are interlaced with the remaining lands for the drive leads. This configuration reduces noise in a number of different ways. The first has to do with image currents. In the present arrangement, the image currents which flow in the memory plane 64 directly beneath both the selected drive lead and the return lead follow essentially closed paths and remain on the upper surface of the memory plane 64. Very little image current flows beneath the sense plane 62 since the return path which would have to be taken there is much, much longer than the return path which is available on the upper surface of the memory plane. This is because common return for the drive leads crosses the edge of the memory plane immediately adjacent to the locations at which the drive leads cross the edge of the memory plane and therefore the return path for the image current is very short on the upper surface of the memory plane. Since little or none of the image current flows beneath the memory plane, that is, on the surface of the memory plane facing the sense plane, substantially no noise due to image currents is induced in the sense plane.

A second reason that the drive lead configuration causes very little spurious signals to be induced in the sense plane 62 is that, for the major portion of the extent of the leads, they are shielded by the memory plane 64 itself. Since there is very little unshielded loop length remaining, the amount of spurious signal which may be radiated (to the sense circuit) is relatively low. Some signal is, however, picked up by loops A and B—the portion of the sense circuit which is not shielded by the memory plane 64. The end of the memory plane is indicated in FIGURE 5 by the dashed lines 132.

The loops A and B in the present system are made to have substantially the same area. In addition, the loop configuration is such that a spurious signal induced in loop A causes the primary winding to produce a voltage which is in the opposite direction from that produced due to spurious pick-up by loop B. Since the loops are of the same relative areas, the amplitudes of the spurious signals coupled into the two loops is substantially equal and these spurious signals therefore tend to cancel at the output terminals 114 of the transformer.

The primary winding arrangement of FIGURE 5 does not adversely affect the amplitude of the desired sense signal. The latter causes a current to be induced in the sense plane as, for example, is indicated generally at 142 and 143. The current and primary winding directions are such that the sense voltage produced at the terminals 114 of the secondary winding 112 is a function of the sum of the signals produced by the two primary windings.

The memory of FIGURE 6 includes the elements of the memory of FIGURES 4 and 5. In addition, there are X and Y selection trees 152 and 154.

The operation of the memory of FIGURE 6 is believed to be clear from the discussion which has preceded. If, for example, select currents are applied to lands 156 and 158, and the X drive current is concurrently applied to the twisted pair 160, the drive current will steer into legs 162 and 164 and through X drive lead 166. In a similar manner, if Y select currents are applied to lands 168 and 170, and a Y drive current is concurrently applied to twisted pair 172, that drive current will steer through legs 174 and 176 to Y drive lead 178. The memory location selected under these conditions is the one lying between the cross-over of leads 166 and 178.

The noise-reducing means already described are employed in the circuit of FIGURE 6. The sense plane (shown by dashes in FIGURE 6) may be similar to the sense plane of FIGURE 5. The common return leads, such as 180 and 182, are returned over the memory plane and brought out immediately adjacent to the input leads to the two selection trees. Therefore, the image currents remain largely in the upper surface of the memory plane. In a similar manner, the common return leads for the selected current inputs is brought out close to the remaining select current leads.

In the memories discussed above, the sense plane in each case is spaced from the memory plane throughout its entire extent. However, the principles of the invention are also applicable to embodiments of the invention in which the sense plane is joined at one edge to the memory plane. An exploded view showing a portion of such a memory appears in FIGURE 7. The drive lines and common returns, which are not illustrated, may be similar to the corresponding elements of the memory of FIGURE 4 or 6. The memory plane is shown at 200 and the sense plane at 202. The sense plane is joined to the memory plane at edge 204. (In practice, the joint is made by having a portion of the sense plane uninsulated and allowing the superconductor metal to come into contact therewith during deposition. However, this joint is accentuated and shown as a raised edge for purposes of illustration.) The actual position of the sense plane beneath the memory plane is indicated by the dashed lines 206.

The thin film extension of the memory plane is formed with a pair of lands 208–210, which are located at opposite edges of the plane extension. The sense plane is formed with a single land 212, which is located between the lands 208 and 210. The primary windings 214 and 216 are arranged similarly to the primary windings shown in FIGURE 5. Loops A′ and B′ are so arranged that any spurious signals they receive tend to produce voltages of opposite polarity with respect to the output 215 and equal amplitude at the two primary windings

214 and 216. Accordingly, as in the previous arrangement, this source of noise is substantially reduced.

For purposes of illustration, the memories discussed are shown to have only 16 storage locations. It is to be appreciated, of course, that many more storage locations are possible. A common size, for example, is 128 x 128 (storage location), and memories with well upwards of $10^6$ storage locations appear to be feasible.

For purposes of illustration, the memory plane has been stated to be made of tin. It is possible to use other superconductor materials instead of tin. The same holds for the sense plane. At present, silver is a preferred material. However, copper or gold are also suitable and superconducting materials have also been used. A preferred form of insulation is silicon monoxide. However, here too, the invention is not limited to this particular material.

The input drive leads shown are twisted pairs. This has been found to give good, low-noise performance at relatively low cost. However, other forms of transmission lines may be used instead.

A photograph of a 4 x 4 memory array, similar to the one of FIGURE 6 described herein, appears in FIGURE 4 of Burns et al. "A Large Capacity Cryoelectric Memory with Cavity Sensing," Fall Joint Computer Conference Proceedings, November 1963, pages 91–99.

What is claimed is:

1. In a cryoelectric memory,
a superconductor memory plane;
a plurality of drive leads which are insulated from the memory plane and lying over one surface of the memory plane; and
a return lead which is insulated from the memory plane, connected at one end to one end of each of said plurality of drive leads and lying over one surface of the memory plane for substantially the entire length of said return lead.

2. In a cryoelectric memory,
a thin-film superconductor plane;
a plurality of thin-film superconductor drive leads for writing information into the memory, which leads are insulated from the superconductor plane and which lie over one surface thereof; and
a return lead which is insulated from the superconductor plane, connected at one end to one end of said plurality of drive leads, extending for substantially its entire length over said one surface of the superconductor plane, and forming with each drive lead, a conductive path which crosses an edge of the superconductor plane where it enters the superconductor plane at a location immediately adjacent to the location at which the conductive path crosses the edge of the superconductor plane where it leaves the superconductor plane.

3. In a cryoelectric memory, in combination,
a superconductor plane;
a plurality of superconductor drive lines terminating in spaced lands at one end of said lines and in a common connection over the superconductor plane at the other end of said lines, said lines being insulated from the superconductor plane and lying over one surface of the superconductor plane throughout substantially their entire length; and
a common return line which is insulated from the superconductor plane, connected at one end to said common connection, terminating at its other end in a plurality of spaced lands which are interleaved with the spaced lands for the superconductor drive lines, and which lies over the same surface of the superconductor plane as the drive lines throughout substantially its entire length.

4. In a cryoelectric memory, in combination,
a superconductor memory plane;
a plurality of superconductor drive lines terminating in spaced lands at one end of said lines and in a common connection located over the memory plane at the other end of said lines, said lines being insulated from the memory plane and lying over one surface of the memory plane throughout substantially their entire length; and a common return line which is insulated from the memory plane, connected at one end to said common connection, crossing close to its other end the other end portion of the drive lines at locations over the memory plane, terminating at said other end in a plurality of spaced lands which are interleaved with the spaced lands for the superconductor drive lines, said common return lead lying over the same surface of the memory plane as the drive lines throughout substantially its entire length.

5. In a cryoelectric memory, a superconductor memory plane;

a plurality of drive leads, to one end of which a drive current may be applied, which leads are insulated from the memory plane and which lie over one surface of the memory plane; and a return lead which is insulated from the memory plane, connected at one end to the other end of said plurality of drive leads, lying over one surface of the memory plane for substantially the entire length of said return lead, and passing off the memory plane at a point close to that at which the drive current is applied.

6. In a cryoelectric memory, a superconductor plane;

means at one edge of the superconductor plane for applying a memory drive current; and a lead connected to receive the drive current which is insulated from and lies over the superconductor plane throughout its length, which folds back on itself close to the edge thereof at which the drive current is applied, and which passes off the superconductor plane close to the point at which the drive current is applied.

7. In a cryoelectric memory, a thin-film superconductor memory plane;

a sense plane which is insulated throughout its entire extent from the memory plane and which lies immediately adjacent to one surface of the memory plane, said sense plane being formed with two peripheral slots, one adjacent one edge portion of the sense plane and the other adjacent another edge portion of the sense plane, said two slots terminating close to one another at one edge of the sense plane; and three output terminals for the sense plane, located at the portion of the sense plane at which the slots terminate, the first on one side of the first slot, the second in the region of the sense plane on the other side of the first slot and between the first and second slots, and the third in the region of the sense plane on the other side of the second slot from the second connection.

8. In a cryoelectric memory, a thin-film superconductor memory plane;

a sense plane which is insulated throughout its entire extent from the memory plane and which lies immediately adjacent to one surface of the memory plane, said sense plane being formed with two peripheral slots, one adjacent one edge portion of the sense plane and the other adjacent another edge portion of the sense plane, said two slots terminating close to one another at one edge of the sense plane;

three output terminals for the sense plane, located at the portion of the sense plane at which the slots terminate, the first on one side of the first slot, the second in the region of the sense plane on the other side of the first slot and between the first and second slots, and the third in the region of the sense plane on the other side of the second slot from the second connection; and transformer means having two primary windings, the first primary winding connected to the first and second terminals and the second primary winding connected to the second and third terminals, the connections being in a sense such that spurious signals induced in the leads which extend between the primary windings and the three terminals tend to cancel.

9. In a cryoelectric memory, a thin-film superconductor memory plane;

a plurality of X drive leads which are insulated from the memory plane lying over one surface of the memory plane;

a plurality of Y drive leads which extend at substantially right angles to and cross over the X drive leads insulated from both the memory plane and the X drive leads and lying over the same surface of the memory plane as the X drive leads;

a first return lead which is insulated from the memory plane connected at one end to one end of the plurality of X drive leads, extending for substantially its entire length over said one surface of the memory plane, and forming with each X drive lead a superconductive path which crosses over on itself on the memory plane;

a second return lead which is insulated from the memory plane connected at one end to one end of the plurality of Y drive leads, extending for substantially its entire length over said one surface of the memory plane, and forming with each Y drive lead a superconductive path which crosses over on itself on the memory plane;

a sense plane which is insulated throughout its entire extent from the memory plane and lying immediately adjacent the other surface of the memory plane, said sense plane being formed with two continuous peripheral slots which start at one corner of the sense plane, one slot adjacent two sides of the sense plane and the other slot adjacent the other two sides of the sense plane, said two slots terminating close to one another at one edge of the sense plane and forming at said termination first, second and third tabs, the second tab lying between the two slots and the first and third tabs lying on the opposite side of the first and second slots, respectively; and transformer means having two primary windings, the first primary winding connected to the first and second tabs and the second primary winding connected to the second and third tabs, the connections being in a sense such that a sense signal induced in the sense plane produces additive voltages at the two primary windings, and noise signals radiated from the drive leads directly to said connections tend to cancel.

10. In a cryoelectric memory, in combination, a superconductor memory plane;

a sense plane beneath the memory plane having an output terminal not shielded by the memory plane coupled to one edge portion of the sense plane;

second and third output terminals not shielded by the memory plane, one located adjacent to and on one side of said first-mentioned output terminal and the other located adjacent to and on the other side of said first output terminal;

means coupling said second and third output terminals to the edge portion of said sense plane opposite the portion thereof coupled to said first output terminal;

a transformer having two primary windings; and connections between the first and third terminals and one primary winding, and the first and second terminals and the second primary winding, said connections being in a sense such that signals radiated directly thereto produce voltages of opposite polarity at said primary windings and sense signals picked up by the sense plane cause additive signals at said primary windings.

11. In the combination set forth in claim 10, said sense plane being joined to the memory plane at said edge portion thereof leading to said second and third terminals, said memory plane serving as the connection between said sense plane and said second and third output terminals.

12. In the combination set forth in claim 10, said sense plane being spaced throughout its entire extent from the memory plane.

References Cited

UNITED STATES PATENTS

| | | | |
|---|---|---|---|
| 2,966,647 | 12/1960 | Lentz | 340—173.1 |
| 3,172,085 | 3/1965 | Burns et al. | 340—173.1 |

OTHER REFERENCES

RCA Engineer: December 1963–January 1964, "A Large Capacity Cryoelectric Memory with Cavity Sensing," by Burns et al., pp. 74–75.

TERRELL W. FEARS, *Primary Examiner.*